UNITED STATES PATENT OFFICE.

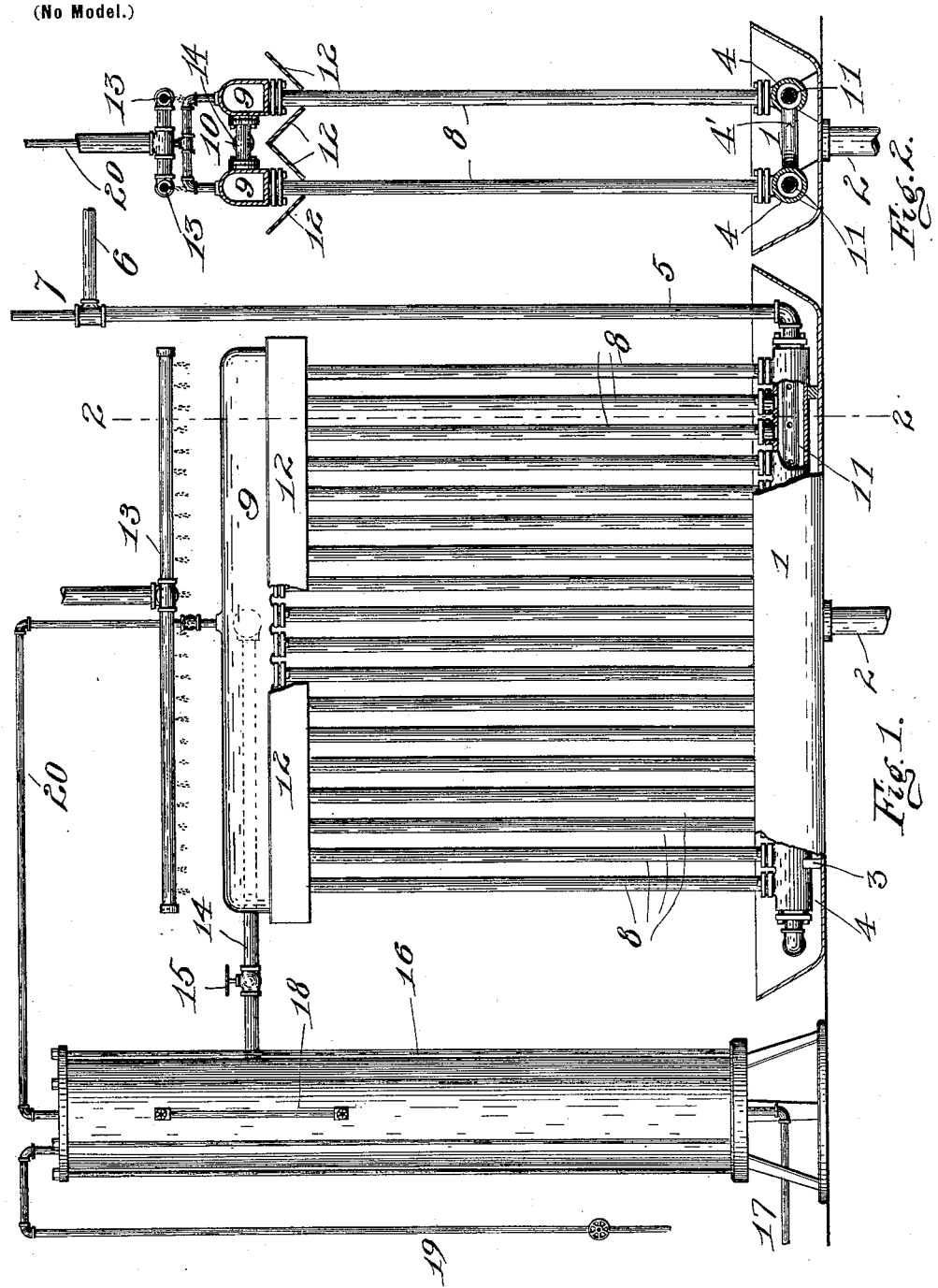

PIERCE R. McCRARY, OF ATLANTA, GEORGIA.

ABSORBER FOR REFRIGERATING-MACHINES.

SPECIFICATION forming part of Letters Patent No. 633,143, dated September 19, 1899.

Application filed August 19, 1897. Serial No. 648,815. (No model.)

*To all whom it may concern:*

Be it known that I, PIERCE R. MCCRARY, a citizen of the United States of America, and a resident of Atlanta, in the county of Fulton and State of Georgia, have made certain new and useful Improvements in Absorbers for Refrigerating-Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The nature and object of this invention will be fully understood upon a description thereof.

In the accompanying drawings, Figure 1 is a side elevation of the device, partly in section. Fig. 2 is a cross-section on the line 2 2, Fig. 1.

In the figures like reference characters are uniformly employed in the designation of corresponding elements of construction.

1 is a pan, and 2 is a drain-pipe leading therefrom. Seated in the pan, on suitable blocks 3, or otherwise supported, as desired, are manifolds 4, which are preferably of cast-iron and are connected at one end, as shown in Fig. 1, by a connecting-pipe 4'. The other ends of the said manifolds have a mixing-pipe 5 connected to them. The pipe 5 has connected to it a pipe 6, which conducts a weak liquor from the still, and a pipe 7 is also connected to said pipe 5 and leads thereto from the expansion-coils, bringing the expanded ammonia-gas from said coils and into contact with the inflowing weak liquor, into which it is absorbed partially into pipe 5 and passes into manifolds 4. Connected with manifolds 4 at their bottoms are pipes 8, manifolds 9 receiving the upper ends thereof and being connected by a pipe 10. Perforated inlet-pipes 11 are provided in the manifolds 4 and are connected to the mixing-pipe 5, so as to form extensions of it. The perforations cause the gas to issue at a series of points in its length, so that the gas is distributed among the pipes 8. The gas and liquid pass upward through the pipes 8 in the same direction from one manifold to the other, and the gas is absorbed by contact with the liquid.

12 are fenders forming water-sheds, which contact their lower edges with the pipes 8 and so deflect the water which flows from the sprinkler-heads 13 onto the top of the manifolds 9 into contact with the pipes 8. Leading from the pipe 10 is a pipe 14, provided with a throttle-valve 15 and leading to the receiver 16, which is a strong-water receiver, whence it is taken to the still or other objectpoint by means of a pipe 17.

18 is a glass gage, whereby the height of strong liquor in the receiver 16 may be noted, and 19 is a waste-pipe through which is taken the incidental gases which are thrown out through the process and a burden thereto by reason of their being non-absorbable under the existing conditions.

20 is a pipe connecting the manifolds 9 with the upper end of the receiver 16, whereby an equal pressure is obtained in both the absorber and the receiver 16.

The operation of this device is as follows: The expanded ammonia-gas coming from the expansion-coils through the pipe 7 meets inflowing weak liquor entering the pipe 5 through the pipe 6 and passes downwardly, being gradually absorbed, and the strong water thus created passes into the manifolds 4 from the pipe 11, being distributed uniformly throughout the length of said manifolds and passing upwardly through the vertical cooling-pipes 8, upon which water is sprayed from the sprinkling-head 13, said water falling on the manifolds 9 and over them to the fenders 12, by which it is deflected onto the said pipes 8 and whereby they are kept cool. A portion of the water is converted into steam as it trickles down the pipes 8, and the cooling of the pipes is effected partly by conduction and also partly by evaporation, because the pipes are exposed to the atmosphere. A portion of heat is abstracted by the water and an additional portion of heat is caused to become latent by the conversion of a portion of the water into steam. The strong liquor then passes through the pipes 10 and 14 to the storage-tank 16, whence it may be drawn to the still or vaporizer through the pipe 17. The pipe 19 carries off the unavailable gases resultant from the process, and the pipe 20 acts to equalize the pressure on the absorber and the storage-tank.

Having thus described my invention, what

I claim as new, and desire to secure by Letters Patent of the United States, is—

1. In an absorber, for refrigerating-machines, a manifold another manifold above same, pipes connecting said manifolds, an outlet-pipe connected with the upper manifold and an inlet-pipe entering and extending throughout said lower manifold, a gas-pipe and a water-pipe entering said inlet-pipe, for the purpose specified.

2. In an absorber for refrigerating-machines, a manifold another manifold above same, pipes connecting said manifolds an outlet-pipe connected with the upper manifold and an inlet-pipe connected to the lower manifold, a gas-pipe and a water-pipe entering said inlet-pipe a sprinkler-head located above said top manifold and fenders inclined downwardly to near the connecting-pipes and lying below said upper manifold, for the purpose specified.

3. In an absorber for refrigerating-machines a pan having a drain connection, manifolds supported therein apertured upwardly, a pipe extending through each of said manifolds and perforated along its sides, gas and weak-liquor connection for said pipes, upper manifolds apertured downwardly, pipes connecting said manifolds at their correlative apertures, a discharge connected to said upper manifolds, fenders adapted to deflect water against the pipes connecting said manifolds and means for sprinkling water upon said top upper manifolds and fenders, substantially as and for the purpose specified.

4. In an absorber, the combination, with two manifolds, and a series of pipes connecting them; of a perforated inlet-pipe arranged in one of the said manifolds and operating to cause gas and liquid to flow in the same direction through each said pipe from one manifold to the other, substantially as set forth.

5. In an absorber, the combination, with two manifolds, a series of substantially vertical pipes connecting said manifolds, said pipes and manifolds being exposed to the atmosphere, and means for causing gas and liquid to flow in the same direction through the said pipes from the lower to the upper manifold; of devices for discharging water onto the upper part of the absorber, and guides constraining the water to trickle down the outer sides of the said pipes, substantially as set forth.

6. In an absorber, the combination, with two manifolds, and a series of pipes connecting them; of a perforated inlet-pipe arranged in one of the said manifolds and operating to cause gas and liquid to flow in the same direction through each said pipe from one manifold to the other, an outlet-pipe connected to the other said manifold, a mixing-pipe connected to the said perforated pipe, and separate pipes for gas and for liquid connected with the said mixing-pipe, substantially as set forth.

In testimony whereof I hereunto affix my signature in presence of two witnesses.

PIERCE R. McCRARY.

Witnesses:
A. P. WOOD,
S. M. WOOD.